United States Patent

[11] 3,578,109

| [72] | Inventor | Marcel Gagnon<br>Frelighsburg, Co. Missisiquoi, Quebec, Canada |
|---|---|---|
| [21] | Appl. No. | 803,553 |
| [22] | Filed | Mar. 3, 1969 |
| [45] | Patented | May 11, 1971 |

[54] APPARATUS FOR PICKING APPLES OR THE LIKE FRUITS
3 Claims, 5 Drawing Figs.

| [52] | U.S. Cl. | 182/129 |
|---|---|---|
| [51] | Int. Cl. | E04g 1/15 |
| [50] | Field of Search | 182/131, 132, 129 |

[56] References Cited
UNITED STATES PATENTS

| 2,450,812 | 10/1948 | Ray | 182/63UX |
|---|---|---|---|
| 2,962,293 | 11/1960 | Malami | 182/132X |
| 3,085,650 | 4/1963 | Merk | 182/131UX |
| 3,352,380 | 11/1967 | Barney | 182/131 |

*Primary Examiner*—Kenneth Downey
*Attorney*—Raymond A. Robic

ABSTRACT: A stairwaylike platform for mechanically harvesting apples or other fruits. It comprises a staircase provided with means for moving the same between rows of apple trees or the like. For this purpose the staircase is mounted on wheels and adapted to be pulled by a tractor. It is also capable of steering. The staircase has retractable steps on either side thereof and these steps are movable between a retracted position inside the staircase and an overhanging position when withdrawn laterally on either side thereof. The retractable steps are operable through any suitable means, which are preferably hydraulic. The staircase may have an inner enclosure for a preliminary classification and loading of apples into boxes.

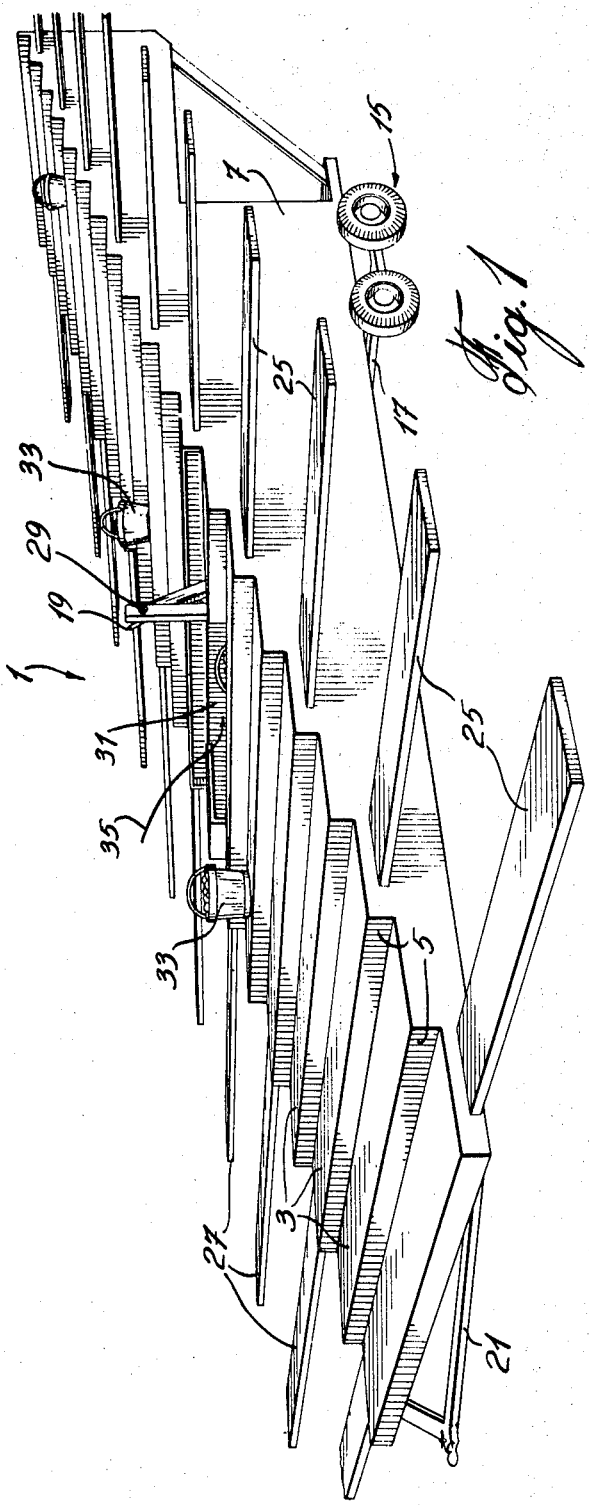

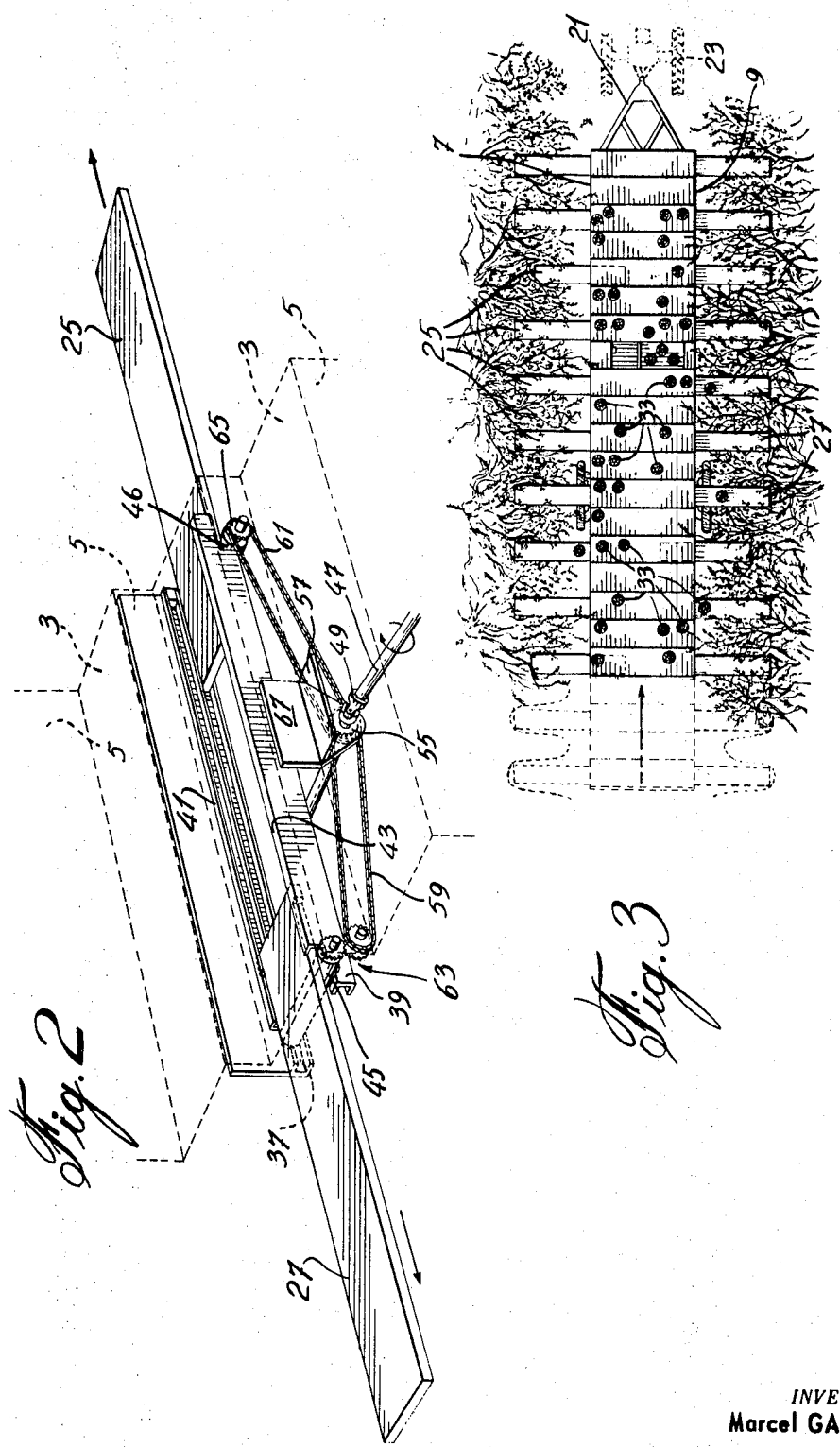

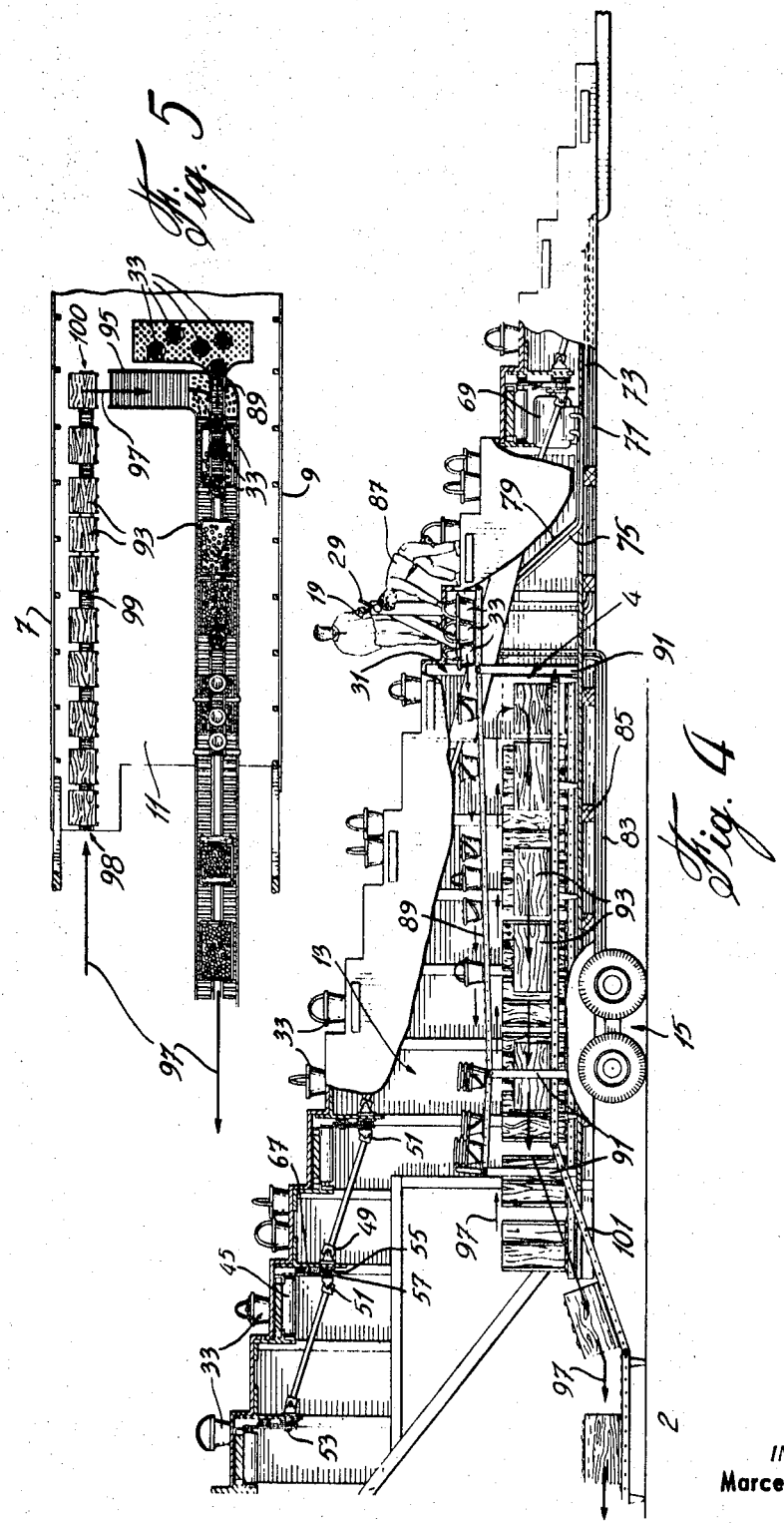

APPARATUS FOR PICKING APPLES OR THE LIKE FRUITS

This invention relates to an apparatus for picking apples or the like fruits borne by trees and usually out of reach of a standing man. More particularly, the invention is directed to a device in the form of a stairwaylike platform which permits at least a partially mechanical harvesting of apples or other fruits.

The harvesting of apples has in the past been carried out exclusively by hand. The only assistance to the workers mainly consists in the use of ladders or any other kind of vertical extensions by which it is possible to easily reach the apples or other fruits in the trees. Of course, apparatuses have been designed with the ultimate goal to provide a completely mechanical picking and harvesting of apples. However, for all kinds of reasons, these apparatuses were found unsatisfactory and the cost of most of them is often prohibitive. Basically, the apple picking machine must be able to support a certain number of workers and must require a low investment. The machine must also provide grading facilities to avoid useless handlings of better quality fruits.

It should be remembered that the fruit picking operation is seasonal so that a suitable apparatus must be designed with this in mind, which means that it must of necessity be produced at low cost.

The hand picking of apples or other fruits is presently no longer practical because, with large orchards, it is not possible to find enough workers. On the other hand, the cost of the machines which have recently been designed is prohibitive since it means much too large an investment for a seasonal operation and does not necessarily improve the present harvesting methods.

I have found that these disadvantages may be overcome by providing an apparatus which is basically in the form of a staircase capable of moving between rows of apple trees or the like and comprising retractable steps movable between a hidden position inside the staircase and a overhanging position when they extend on either side of the staircase. The apparatus also comprises any known means for retracting and withdrawing the above steps.

The staircase may be mounted on wheels to displace it through the orchard and, for this purpose, it should have means for steering the wheels.

It is preferred to pull the machine with a tractor and the staircase is therefore provided with a suitable tow bar to be hitched at the rear of the tractor.

In accordance with an embodiment of this the invention, the staircase comprises a plurality of central steps and there are provided enough overhanging steps to extend on either side of the staircase corresponding with every other central steps.

The staircase may comprise vertical lateral walls extending from the central steps and, in this case, there should be a floor connecting the lower edges of these lateral walls so as to define an inner enclosure.

A suitable opening is provided for delivering the fruits inside the enclosure, the opening being formed in the central steps and being wide enough to permit the passage of a basket of apples or other fruits.

In accordance with a further embodiment of the invention, means are provided inside the enclosure for mechanically conveying boxes, loaded with apples, outside the enclosure, the said boxes having been loaded mechanically by any known means or by hand, inside the enclosure.

The central steps may be allowed to slide along suitable guiding and sliding means provided inside the staircase immediately underneath the central steps wherein the overhanging steps are received in sliding engagement therein. Each overhanging step then rests over a friction roller and means are provided to operate the rollers to cause extension or retraction of the overhanging steps.

In the drawings which illustrate an embodiment according to the invention,

FIG. 1 is a perspective view of the apple picking device of the invention;

FIG. 2 is an enlarged partial perspective view of the mechanism which serves to draw out or retract the overhanging steps;

FIG. 3 is a top plan view of the apparatus, hitched to a tractor, in operation between two rows of trimmed apple trees;

FIG. 4 is an elevation view partially in cross section; and

FIG. 5 is a top plan view of the conveyor system used to load boxes with apples and deliver them outside the enclosure.

Referring to the drawings, the apparatus according to the invention generally comprises a staircase 1 having the general shape and appearance illustrated in FIGS. 1 and 4 of the drawings. The staircase 1 comprises a plurality of central steps 3, the number of which may vary according to the size and height of the staircase 1. Of course, each step 3 has its corresponding counterstep 5. The staircase has vertical lateral walls 7 and 9 projecting downwardly from the steps 3 on either side thereof (FIG. 5) and a floor 11 to connect the lower edges of the walls 7 and 9 thus forming an enclosure 13 (FIG. 4) inside the staircase 1.

The staircase 1 is mounted at the rear end thereof on a wheel bogie 15 comprising two pairs of wheels mounted on an axle 17 (FIG. 1) which is capable of being steered by operation of a conventional steering control 19 (FIG. 4).

The front end of the staircase 1 has a tow bar 21 which is adapted to be hitched to the rear end of a tractor 23 (FIG. 3).

On either side of the staircase 1, and corresponding with every other step 3, the staircase comprises a plurality of overhanging steps 25 and 27 which are movable between a hidden retracted position inside the staircase 1 and an overhanging position (FIG. 1) when extended on either side of the staircase. For this purpose, suitable apertures are provided on each side of the staircase 1.

The device is provided with a hydraulic control 29 for controlling the movement of the overhanging steps 25 and 27 in and out of the staircase 1. The operation of the steering control 19 and of the hydraulic control 29 will be described more fully hereinafter.

Referring to FIGS. 1 and 4, the apparatus according to the invention will also be seen to comprise an opening 31, through a step not provided with overhanging steps, to allow entry of the baskets of apples 33 within the enclosure 13 in the direction indicated by the arrow 35 in FIG. 1.

Two pairs of guiding channels 37, 39 and 41, 43 (FIG. 2) are provided inside the staircase 1, underneath every other central step 3. The channels 37, 39 are intended to receive overhanging steps 25 on the right-hand side of the staircase and the channels 41, 43 are used to receive overhanging steps 29 on the left-hand side of the staircase 1.

Each overhanging step 25 or 27 rests in contact with and over friction rollers 45 or 46 respectively which, upon rotation, will cause either withdrawal or retraction of the overhanging steps 25 or 27 as particularly illustrated in FIG. 2 of the drawings.

Each friction roller 45 or 46 is mounted in suitable bushings (not shown) and is operatively connected through a gear and sprocket chain arrangement to a shaft section 47. It is obvious that there are as many interconnected shaft sections 47 as there are pairs of overhanging steps 25 as well illustrated in FIG. 4. We shall therefore describe only one such arrangement.

The shaft section 47 is provided at the upper end thereof with a universal joint 49 and at the lower end with a similar universal joint 51. The universal joint 49 is connected to the universal joint 51 through an axle 53 which has, fixedly mounted thereon, a pair of gears 55 and 57 and this is the particular manner in which the shaft sections 47 are interconnected. Gears 55 and 57 will respectively operate the sprocket chains 59 and 61. It will thus be understood that the gear assembly 63, which is rotated by sprocket chain 59, will cause the friction roller 45 to rotate in a direction opposite that of the friction roller 46, which is rotated through gear assembly 65 whereby both overhanging steps will be simultaneously retracted or withdrawn. The assembly comprising universal joints 49 and 51 (51 not shown in FIG. 2), axle 53 and both gears 55 and 57 is held together and mounted on the body of the staircase 1 by means of a bracket 67. The various shaft sections 47 are all similarly connected together to operate simultaneously and are operatively connected to a hydraulic motor 69 which operates through the oil pump (not shown) of the tractor 23. The hydraulic control 29 which is used either for retracting or withdrawing the overhanging steps 25 and 27 is preferably provided in a suitable position, preferably towards the lower end of the staircaselike platform in the manner illustrated in FIGS. 1 and 4 of the drawings. It is directly in connection with the oil pump (not shown) of the tractor 23 by means of the two oil ducts 71 and 73 on one side and with the two oil ducts 75 and 79 leading to the hydraulic motor 69 on the other side. The hydraulic motor will therefore be operated by opening the oil circuit in the above oil ducts 71, 73, 75 and 79.

The steering control 19 is mounted side-by-side with the hydraulic control 29 and is also directly in connection with the oil pump (not shown) of the tractor 23 by means of the same two oil ducts 71 and 73 on one side but on the other side is connected to the oil ducts 81 and 83 to the steering assembly (not shown) close to the wheel assembly 15.

As illustrated in the drawings, there is enough space within the enclosure 13 for carrying out a preliminary classification of the apples.

The baskets 33 delivered through the opening 31 by the workers 87 are received on a small rearwardly inclined roller conveyor 89 provided at a suitable height and mounted on the supports 91. The baskets 33 are unloaded into boxes 93, while receiving a preliminary classification, when they reach the end of conveyor 89. When filled with apples, boxes 93 are sent outside the enclosure 13 by being conveyed on a roller conveyor 95 provided on the floor 11 of the enclosure 13. The travel of the boxes inside the staircase, within the enclosure 13, is well illustrated by the arrows 97 in FIG. 5. Boxes 93 are received empty at the outer end 98 of an inlet conveyor 99 and are placed thereon edgewise with the opening facing the lateral wall 7. When reaching the end 100 of conveyor 99, the boxes are tilted into conveyor 95 so that their opening faces up, ready to receive apples. The brackets 33, from conveyor 89, are emptied into the boxes 93 which are carried toward the inclined portion 101 and, thence, onto horizontal portion 102 where the boxes are picked up and loaded on a truck.

While the machine according to the present invention may be used to harvest apples to any other fruit from conventionally pruned trees, it has however been found to operate more efficiently when rows of trees are converted into hedge rows arranged to fit the machine. This is clearly illustrated in FIG. 3 of the drawings where it is seen that the rows of trees have been converted into hedge rows and trimmed to allow a deep penetration of the overhanging steps in the apple trees.

This machine is inexpensive, simple to operate and has largely contributed to decrease the cost of harvesting apples. It has been found especially advantageous for the operation called spot picking when a selection of the apples is made before the final harvesting, and wherein the apple pickers stand on the overhanging steps of the invention, deep inside the apple trees. Furthermore, by means of a permanent marker post provided in the hedge row, it is possible to mark the place exactly where it is intended to stop the penetration of the overhanging step. In this manner, the overhanging step will always penetrate the same distance one harvest after the other.

A very important advantage is a much increased yield because the height of the trees is no longer a problem.

Another advantage is that the fruit is much less susceptible to damage or deterioration.

It has also been found that the electricity generated from the engine which operates the hydraulic system provides adequate lighting for night work. This obviously doubles the efficiency of a single unit per day.

I claim:

1. An apparatus for picking apples or the like fruits, comprising:
   a. a staircase having a plurality of central steps,
   b. said staircase formed with lateral walls projecting downwardly from said central steps, and a floor connected to the lower edges of said lateral walls so as to define, with said staircase, an enclosure,
   c. means for moving said staircase between rows of apple trees or the like,
   d. retractable steps provided in said staircase on either side of said staircase to correspond with every other central step, said retractable steps movable between a retracted position inside said staircase and an overhanging position when withdrawn laterally on either side of said staircase,
   e. means for retracting and withdrawing said retractable steps, and
   f. an opening formed in said steps to allow inserting apple baskets inside said enclosure.

2. An apparatus as claimed in claim 1, which comprises further means inside said enclosure to receive said baskets and for mechanically conveying boxes loaded with apples outside said enclosure, said boxes having been loaded inside enclosure.

3. An apparatus as claimed in claim 1, which comprises sliding means inside said staircase underneath said steps to receive said retractable steps, each overhanging step resting over a friction roller and means to operate said rollers to extend or retract said overhanging steps.